(12) United States Patent
Kim et al.

(10) Patent No.: US 7,934,767 B2
(45) Date of Patent: *May 3, 2011

(54) OPERATOR CAB FOR HEAVY EQUIPMENT

(75) Inventors: Kang Tae Kim, Changwon (KR); Hideo Kosaka, Onomichi (JP); Yasushi Uchida, Onomichi (JP)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 33 days.

This patent is subject to a terminal disclaimer.

(21) Appl. No.: 11/638,313

(22) Filed: Dec. 13, 2006

(65) Prior Publication Data

US 2008/0106120 A1 May 8, 2008

(30) Foreign Application Priority Data

Nov. 8, 2006 (KR) .................. 10-2006-0109930

(51) Int. Cl.
*B60J 5/06* (2006.01)
(52) U.S. Cl. ............. 296/190.11; 296/190.11; 49/360
(58) Field of Classification Search ............ 296/155, 296/207, 190.11, 190.01, 146.9; 49/225, 49/360

See application file for complete search history.

(56) References Cited

U.S. PATENT DOCUMENTS

| | | | |
|---|---|---|---|
| 1,768,458 A | 6/1930 | Wells | |
| 4,433,507 A | 2/1984 | Chikaraishi | |
| 4,502,246 A * | 3/1985 | Minami | 49/322 |
| 5,577,795 A * | 11/1996 | Shinsen | 296/190.11 |
| 5,802,671 A | 9/1998 | Ikuma | |
| 5,895,089 A | 4/1999 | Singh et al. | |
| 5,906,026 A | 5/1999 | Junttila | |
| 6,036,257 A | 3/2000 | Manuel | |
| 6,611,990 B1 | 9/2003 | Sogo et al. | |
| 7,121,603 B2 * | 10/2006 | Stevenson et al. | 296/26.09 |
| 7,137,662 B2 | 11/2006 | Nakayama et al. | |
| 7,360,823 B2 | 4/2008 | Nakayama et al. | |
| 7,753,436 B2 * | 7/2010 | Kim et al. | 296/155 |
| 2008/0129085 A1 | 6/2008 | Kim | |

* cited by examiner

*Primary Examiner* — Glenn Dayoan
*Assistant Examiner* — Melissa A Black
(74) *Attorney, Agent, or Firm* — Ladas & Parry LLP

(57) ABSTRACT

An operator cab for heavy equipment is disclosed to prevent a sliding door mounted on the cab from rocking or rattling in X, Y, and Z-axis directions due to a shock or vibration applied to the cab in a state that the sliding door is fully opened or closed. The operator cab includes an outer sidewall having a doorway formed thereon; upper and lower rails provided on upper and lower portions of the outer sidewall; a sliding door being slid by upper and lower rollers engaged with the upper and lower rails; an upper stopper of an opened position, installed in the opened position of the outer sidewall, for being in contact with the upper roller when the sliding door is fully opened, to prevent the sliding door from rocking when the upper stopper becomes in contact with the upper roller; and a lower stopper of an opened position, installed in the opened position of the outer sidewall, for being in contact with the lower roller when the sliding door is fully opened, to prevent the sliding door from rocking when the lower stopper becomes in contact with the lower roller.

15 Claims, 15 Drawing Sheets

OPERATOR CAB FOR HEAVY EQUIPMENT

CROSS-REFERENCE TO RELATED APPLICATION

This application is based on and claims priority from Korean Patent Application No. 10-2006-109930, filed on Nov. 8, 2006 in the Korean Intellectual Property Office, the disclosure of which is incorporated herein in its entirety by reference.

BACKGROUND OF THE INVENTION

1. Field of the Invention

The present invention relates to an operator cab for heavy equipment capable of preventing a sliding door from rocking or rattling due to vibration and so on being transferred to the cab in a state that the sliding door mounted on the cab is fully opened or closed.

More particularly, the present invention relates to an operator cab for heavy equipment capable of preventing a sliding door from rocking or rattling in X, Y, and Z-axis directions due to a shock or vibration applied to the cab when the sliding door is in an open or closed state.

Here, the X-axis direction as described above means a forward/backward direction of the cab (i.e., a direction in which the sliding door is opened/closed), the Y-axis direction means a right/left direction of the cab, and the Z-axis direction means an upward/downward direction of the cab.

2. Description of the Prior Art

Generally, it is frequent that common heavy construction equipment such as an excavator is operated with its door kept open in order to secure the operator's view and to ventilate an operator cab during the operation of the equipment. During a swinging operation of the equipment in a state that a hinge type door of the cab is kept open in a narrow or limited working environment such as a downtown area, unexpected collision or bumping with external obstructive objects such as buildings, trees, and so forth, may occur.

In order to solve this problem, as shown in FIG. 1, an operator cab having a sliding door mounted thereon has been used to reduce the swing radius of the cab. This operator cab has been proposed in such a way that an outer sidewall of the cab that includes the sliding door is in an arc shape, and the position of the sliding door remains within the swing radius of the cab when the door is opened.

As illustrated in FIGS. 1 to 3d, a conventional operator cab 2 having a sliding door 3 slidably installed on an outer sidewall 2a, which is disclosed in U.S. Pat. No. 5,577,795, includes a plurality of rails 4, 5, and 6 respectively provided on upper, lower, and central parts of the outer sidewall 2a; a plurality of rollers 7, 8, and 9, mounted on the door 3, for supporting the door 3 when the door 3 is slid between a closed position, in which a doorway 2b is closed, and a fully-opened position, in which the doorway is open; and a plurality of pairs of strikers, each pair including female strikers 10 and 12 and male strikers 11 and 13, one of the strikers of each pair being mounted on the door 3 and the other being mounted on the outer sidewall 2c such that at least one pair of strikers are engaged with each other when the door 3 is in its closed position and at least one pair of strikers are engaged with each other when the door 3 is in its fully-opened position; wherein at least one of the pairs of strikers is mounted in such a way that the strikers are engaged with each other at a front edge portion of the door 3 when the door is fully opened, and at least the other of the pairs of strikers is mounted in such a way that the strikers are engaged with each other at a rear edge portion of the door 3 when the door is fully opened.

In particular, as shown in FIG. 2, the upper roller 7 includes a guide roller 7a that moves along the upper rail 4 when the door 3 is slid, and the lower roller 8 includes a rolling roller 8a which is rotated in an X-axis direction, moving along the lower rail 5, to support the load of the door 3 when the door 3 is slid, and a guide roller 8b which is rotated in a Y-axis direction to prevent the door 3 from being released from the lower rail 5.

As shown in FIG. 3c, the central roller 9 of the door 3 includes a rolling roller 9a which is rotated in an X-axis direction to support the load of the door 3 when the door 3 is slid, and a guide roller 9b which is rotated in a Y-axis direction to prevent the door 3 from being released from the central rail 6 when the sliding door 3 is slid.

In the case where the excavator is driven when the door 3 is fully opened or closed, the door 3 is rocked left and right or rattles upward and downward due to the shock or vibration applied to the cab 2. As a result, an operator cannot concentrate upon his work to lower the operation efficiency and to cause the occurrence of a safety accident.

Taking the above problems into consideration, a plurality of male and female strikers 10, 11, 12, 13, 14, and 15 are provided on the door 3 and the cab 2 and are engaged with each other, as shown in FIGS. 1 and 2, so as to prevent the door 3 from rocking or rattling due to the vibration being transferred to the cab 2 and to detachably support the door 3, when the excavator works in a state that the door 3 is fully opened (see FIG. 3b) or is closed (see FIG. 3a).

As shown in FIG. 1, locking strikers 16 and 17 are installed on the door 3 and the cab 2, respectively, so as to lock the door 3 in its opened or closed position. Specifically, the locking striker 16 is installed in a position adjacent to a doorway 2b, and the locking striker 17 is installed in a position that gets away from the doorway 17.

According to the structure of the conventional cab for heavy equipment as described above, the plurality of male and female strikers 10, 11, 12, 13, 14, and 15 (see FIGS. 1 and 2) and the locking strikers 16 and 17 (see FIG. 1) are installed on the cab 2 and the door 3, respectively, so as to keep the door 3 in a fully-opened or closed state with respect to the cab 2. This causes the number of components and their assembling time and process to be increased with the cost raised. Accordingly, the production efficiency and the price competitiveness thereof are lowered.

In addition, since the strikers 10, 11, 12, 13, 14, and 15 and the locking strikers 16 and 17, which are installed on the cab 2 and the door 3, are outwardly exposed from the door 3, the external appearance of the heavy equipment deteriorates.

In the case of fixing the door 3 to the cab 2 in the opened state, as shown in FIG. 3d, the shock or vibration generated in a direction in which the door 3 is opened (i.e., X-axis direction in the drawing) can be absorbed or suppressed by the structure of the male and female strikers 14 and 15.

However, the shock or vibration generated in the upward/downward direction of the door 3 (i.e., Z-axis direction in the drawing) cannot be effectively suppressed. Also, the shock or vibration generated in the right/left direction of the door 3 (i.e., Y-axis direction in the drawing) cannot be effectively suppressed.

In addition, since the male and female strikers 14 and 15 for fixing the door 3 in the opened state are large-sized and are greatly protruded outward, the external appearance of the heavy equipment deteriorates.

SUMMARY OF THE INVENTION

Accordingly, the present invention has been made to solve the above-mentioned problems occurring in the prior art while advantages achieved by the prior art are maintained intact.

One object of the present invention is to provide an operator cab for heavy equipment capable of preventing a sliding door mounted on the cab from rocking or rattling in three directions (i.e., X, Y, and Z-axis directions) due to a shock or vibration being applied to the cab in a state that the sliding door is fully opened or closed, so that an operator can concentrate upon his work.

Another object of the present invention is to provide an operator cab for heavy equipment capable of minutely changing the fixing position of stoppers when the manufacturing deviation occurs between the operator cab and a sliding door or stopper pads are worn away.

Still another object of the present invention is to provide an operator cab for heavy equipment capable of simplifying the structure of the stoppers to reduce their manufacturing cost, and minimizing protrusion of the stoppers outside the operator cab.

In order to accomplish these objects, there is provided an operator cab for heavy equipment, according an embodiment of the present invention, which includes an outer sidewall having a doorway formed thereon; upper and lower rails provided on upper and lower portions of the outer sidewall, respectively; a sliding door being slid by upper and lower rollers that are engaged with the upper and lower rails, respectively, to open or close the doorway; an upper stopper of an opened position, installed in the opened position of the outer sidewall in which the sliding door is fully opened, for being in contact with the upper roller when the sliding door is fully opened, and preventing the sliding door from rocking by pressure of a pad elastically supported to produce a displacement in an X-axis direction when the upper stopper becomes in contact with the upper roller; and a lower stopper of an opened position, installed in the opened position of the outer sidewall in which the sliding door is fully opened, for being in contact with the lower roller when the sliding door is fully opened, and preventing the sliding door from rocking by pressure of a pad elastically supported to produce a displacement in the X-axis direction when the lower stopper becomes in contact with the lower roller.

According to another aspect of the present invention, there is provided an operator cab for heavy equipment, which includes an outer sidewall having a doorway formed thereon; upper and lower rails provided on upper and lower portions of the outer sidewall, respectively; a sliding door being slid by upper and lower rollers that are engaged with the upper and lower rails, respectively, to open or close the doorway; an upper stopper of an opened position, installed in the opened position of the outer sidewall in which the sliding door is fully opened, for being in contact with the upper roller when the sliding door is fully opened, and preventing the sliding door from rocking by pressure of a pad elastically supported to produce a displacement in an X-axis direction when the upper stopper of the opened position becomes in contact with the upper roller; a lower stopper of an opened position, installed in the opened position of the outer sidewall in which the sliding door is fully opened, for being in contact with the lower roller when the sliding door is fully opened, and preventing the sliding door from rocking by pressure of a pad elastically supported to produce a displacement in the X-axis direction when the lower stopper of the opened position becomes in contact with the lower roller; an upper stopper of a closed position, installed in the closed position of the outer sidewall in which the sliding door is fully closed, for being in contact with the upper roller when the sliding door is fully closed, and preventing the sliding door from rocking by pressure of a pad elastically supported to produce a displacement in the X-axis direction when the upper stopper of the closed position becomes in contact with the upper roller; and a lower stopper of a closed position, installed in the closed position of the outer sidewall in which the sliding door is fully closed, for being in contact with the lower roller when the sliding door is fully closed, and preventing the sliding door from rocking by pressure of a pad elastically supported to produce a displacement in the X-axis direction when the lower stopper of the closed position becomes in contact with the lower roller.

According to still another aspect of the present invention, there is provided an operator cab for heavy equipment, which includes an outer sidewall having a doorway formed thereon; upper, central, and lower rails provided on upper, central, and lower portions of the outer sidewall, respectively; a sliding door being slid by upper, central, and lower rollers that are engaged with the upper, central, and lower rails, respectively, to open or close the doorway; an upper stopper of an opened position, installed in the opened position of the outer sidewall in which the sliding door is fully opened, for being in contact with the upper roller when the sliding door is fully opened, and preventing the sliding door from rocking by pressure of a pad elastically supported to produce a displacement in an X-axis direction when the upper stopper becomes in contact with the upper roller; a central stopper of an opened position, installed in the opened position of the outer sidewall in which the sliding door is fully opened, for being in contact with the central roller when the sliding door is fully opened, and preventing the sliding door from rocking by pressure of a pad elastically supported to produce a displacement in the X-axis direction when the central stopper becomes in contact with the central roller; and a lower stopper of an opened position, installed in the opened position of the outer sidewall in which the sliding door is fully opened, for being in contact with the lower roller when the sliding door is fully opened, and preventing the sliding door from rocking by pressure of a pad elastically supported to produce a displacement in the X-axis direction when the lower stopper becomes in contact with the lower roller.

At least one of the upper and lower stoppers may include a case mounted on the outer sidewall; a pad being movably engaged with a guide fixed to penetrate the case, and having an upper surface upwardly inclined in a direction in which the sliding door is opened or closed; and elastic members installed on outer surfaces of the guide in forward and backward directions of the pad to fix the sliding door by pressing the pad being in contact with either of the upper and lower rollers by their elastic restoring forces when the sliding door is fully opened or closed.

At least one of the upper, central, and lower stoppers may include a case mounted on the outer sidewall; a pad being movably engaged with a guide fixed to penetrate the case, and having an upper surface upwardly inclined in a direction in which the sliding door is opened or closed; and elastic members installed on outer surfaces of the guide in forward and backward directions of the pad to fix the sliding door by pressing the pad being in contact with any one of the upper, central, and lower rollers by their elastic restoring forces when the sliding door is fully opened.

The number of the upper, central, and lower stoppers installed on the outer sidewall may correspond to the number of the upper, central, and lower rollers.

The elastic members may be installed on the guide in the forward and backward directions of the pad.

The elastic members may be installed on the guide in the direction in which the pad is pressed.

The elastic members may be installed on the guide in the forward and backward directions of the pad in such a manner that the elastic member installed in the forward direction of the pad has a strength relatively higher than the elastic member installed in the backward direction of the pad, and is installed on a part of the guide in the forward direction of the pad.

The upper stopper may be installed to press the upper roller in X and Y-axis directions through the pad, when the sliding door is fully opened or closed, to prevent the sliding door from rocking in the X and Y-axis directions.

The lower stopper may include a first lower stopper installed to press a first lower roller in X and Z-axis directions through the pad, when the sliding door is fully opened, to prevent the sliding door from rocking in the X and Z-axis directions; and a second lower stopper installed to press a second lower roller in X and Y-axis directions through the pad, when the sliding door is fully opened, to prevent the sliding door from rocking in the X and Y-axis directions.

The central stopper may include a first central stopper installed to press a first central roller in X and Z-axis directions through the pad, when the sliding door is fully opened, to prevent the sliding door from rocking in the X and Z-axis directions; and a second central stopper installed to press a second central roller in X and Y-axis directions through the pad, when the sliding door is fully opened, to prevent the sliding door from rocking in the X and Y-axis directions.

The case may be provided with a bracket for fixing the case to the outer sidewall, which has elongated fastening holes formed thereon so as to move any one of the upper, central, and lower stoppers in the X or Z-axis direction against the outer sidewall to fix the stopper to the outer sidewall.

The operator cab may further include a supporter, installed on an upper or lower portion of the outer sidewall, for being in surface contact with the sliding door, when the sliding door is fully opened, to prevent the sliding door from racking in the X-axis direction.

The operator cab may further include a stopper bar holder formed on an inner rear surface of the sliding door; a stopper bar installed on the outer sidewall, for being engaged with the stopper bar holder when the sliding door is fully opened, and locking the stopper bar holder, when the sliding door is fully opened, to prevent the sliding door from rocking in the X and Y-axis directions; and a lock striker, installed adjacent to the stopper bar, for being locked by a locking plate installed on the sliding door when the sliding door is fully opened.

The case may further include a pair of partition members, formed to correspond to the forward and backward directions of the case around the pad, for guiding a rectilineal movement of the pad in the X-axis direction if any one of the upper, central, and lower rollers becomes in contact with the slant surface of the pad due to the movement of the sliding door when the sliding door is fully opened or closed.

The stopper bar holder may be made of a plastic material.

The pad may be made of a plastic material.

The supporter may be made of a plastic material.

The upper, central, and lower stoppers are respectively installed at inner end portions of the upper, central, and lower rails of the opened position in which the sliding door is fully opened.

The upper and lower stoppers of the opened position are respectively installed at inner end portions of the upper and lower rails of the opened position in which the sliding door is fully opened, and the upper and lower stoppers of the closed position are respectively installed at inner end portions of the upper and lower rails of the closed position in which the sliding door is fully closed.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
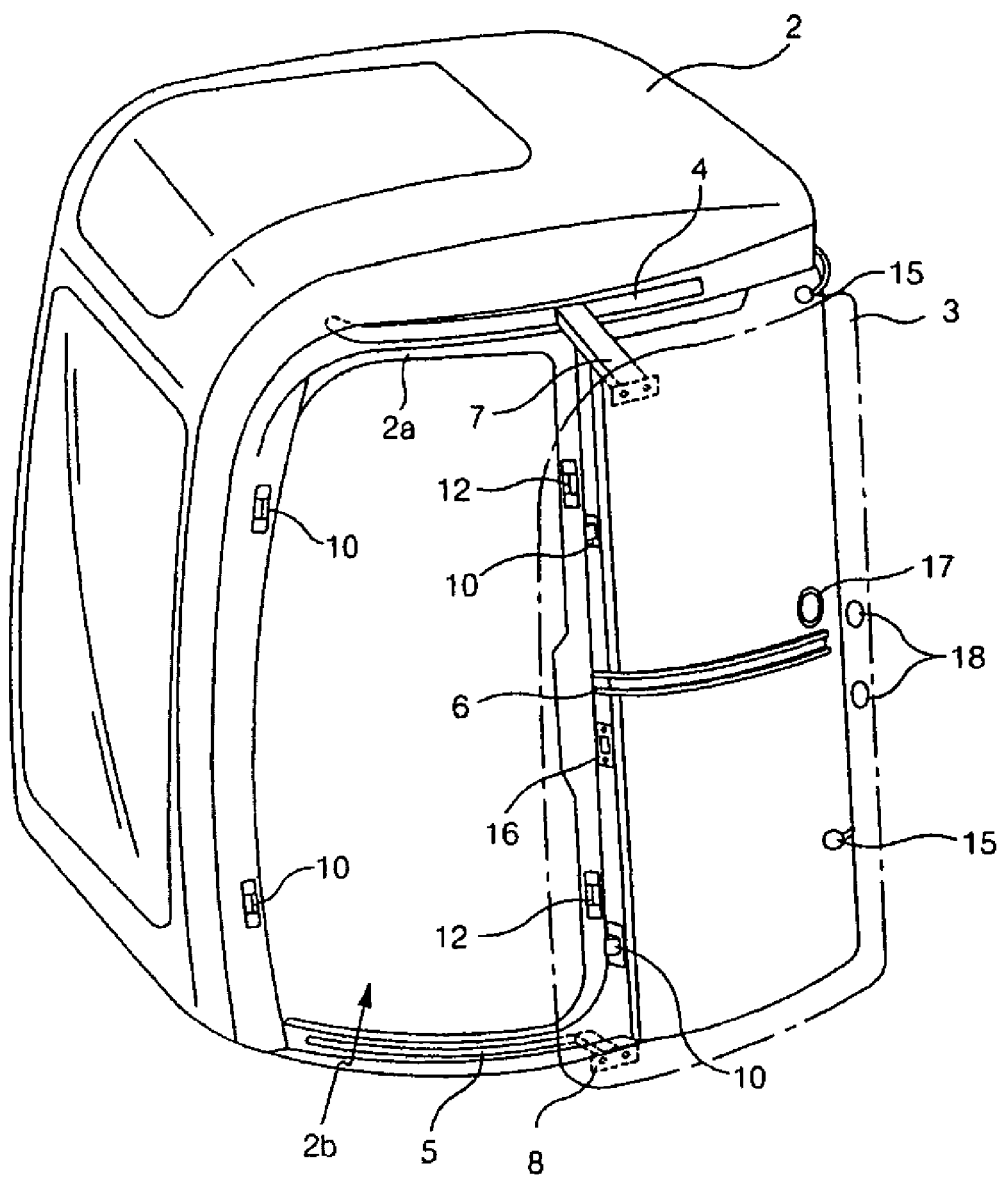
FIG. 1 is a perspective view of a conventional cab for heavy equipment.
Figure 2:
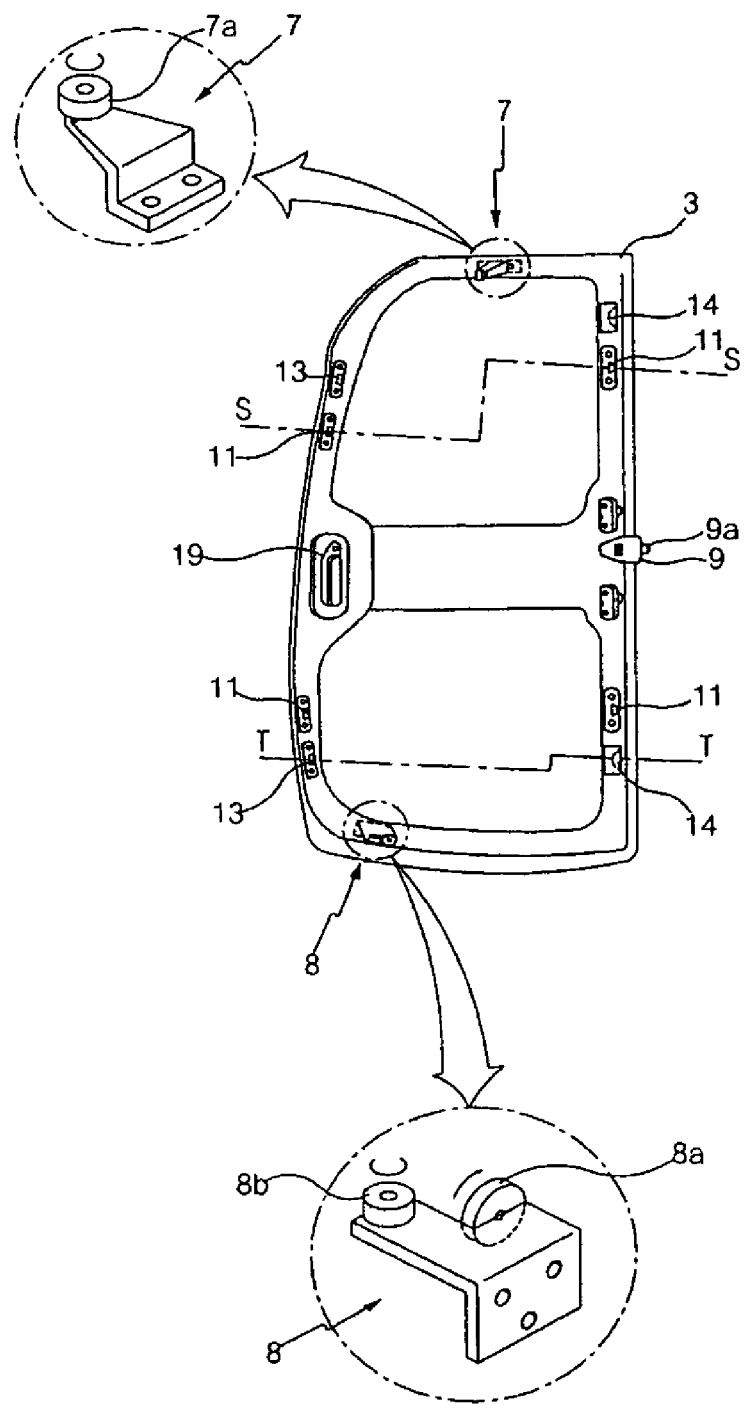
FIG. 2 is a side view of the sliding door shown in FIG. 1.
Figure 3A:
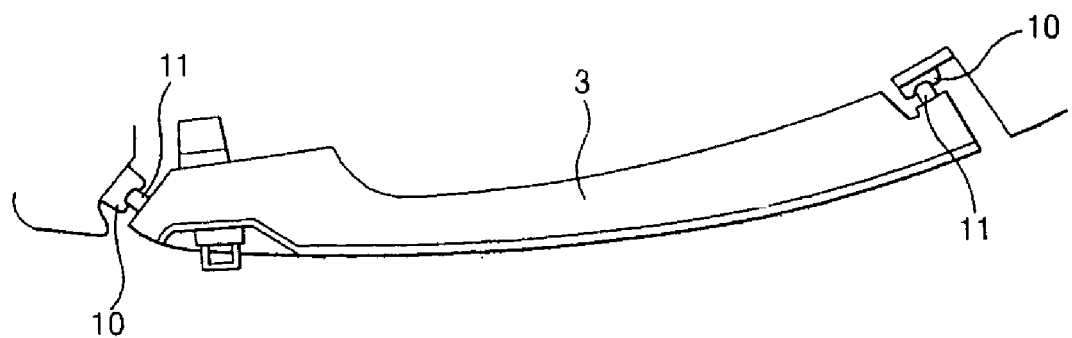
FIG. 3a is a cross-sectional view taken along line S-S in FIG. 2, showing the sliding door in a closed state.
Figure 3B:
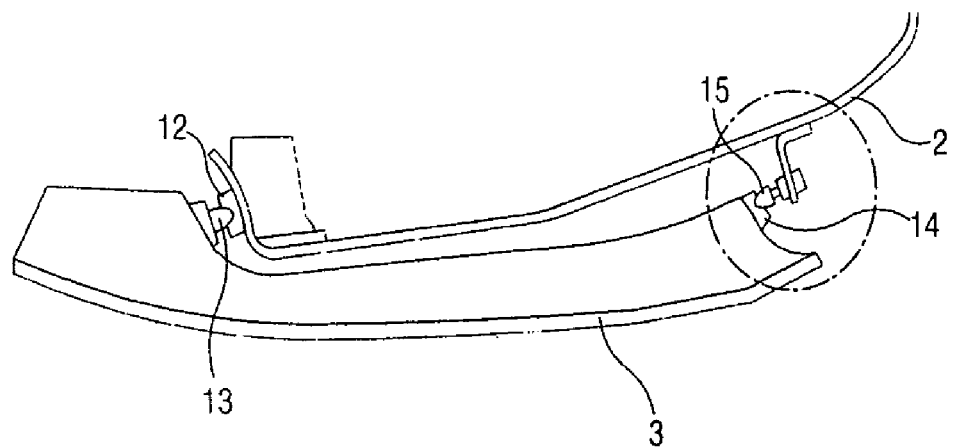
FIG. 3b is a cross-sectional view taken along line T-T in FIG. 2, showing the sliding door in an opened state.
Figure 3C:
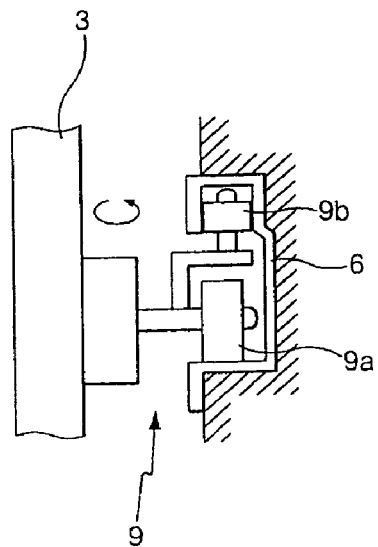
FIG. 3c is a cross-sectional view of a central rail and a central roller shown in FIG. 1.
Figure 3D:
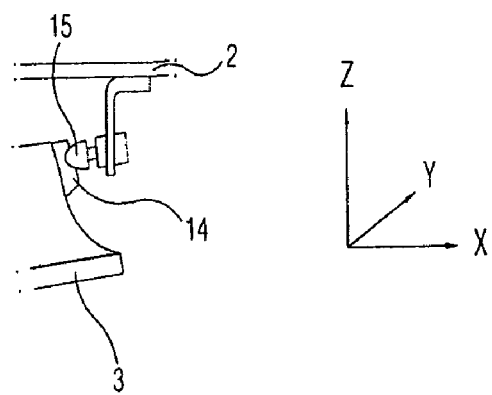
FIG. 3d is an enlarged view of a part indicated by a circle shown in FIG. 3b.

Hereinafter, a preferred embodiment of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

In FIGS. 4, 5, 6, 8, and 9, an operator cab for heavy equipment according to an embodiment of the present invention is illustrated. When a sliding door 3 is fully opened, it is prevented from rocking by an upper stopper 21 and a lower stopper 23.

The operator cab 2 according to an embodiment of the present invention includes an outer sidewall 2a having a doorway 2b formed thereon and an outer surface that is in an arc shape; upper and lower rails 4 and 5 provided on upper and lower portions of the outer sidewall 2a, respectively; a sliding door 3 being slid by upper and lower rollers 7 and 8 that are engaged with the upper and lower rails 4 and 5, respectively, to open or close the doorway 2b; an upper stopper 21 of an opened position, installed in the opened position of the outer sidewall 2a in which the sliding door 3 is fully opened, for being in contact with the upper roller 7 when the sliding door 3 is fully opened, and preventing the sliding door 3 from rocking in X and Y-axis directions by pressure of a pad 20 elastically supported to produce a displacement in an X-axis direction when the upper stopper 21 becomes in contact with the upper roller 7; and a lower stopper 23 of an opened position, installed in the opened position of the outer sidewall 2a in which the sliding door 3 is fully opened, for being in contact with the lower roller 8 when the sliding door 3 is fully opened, and preventing the sliding door from rocking in X, Y, and Z-axis directions by pressure of a pad 20 elastically supported to produce a displacement in the X-axis direction when the lower stopper 23 becomes in contact with the lower roller 8.

The operator cab 2 further includes a supporter 32, installed on an upper or lower portion of the outer sidewall 2a, for being in surface contact with the side surface of the sliding door 3, when the sliding door 3 is fully opened, to prevent the sliding door 3 from racking in the X-axis direction.

The operator cab 2 further includes a rear stopper bar holder 33 formed on an inner rear surface of the sliding door 3 and having engaging members 33a formed on upper and lower portions thereof, the engaging members being "⊂"-shaped and being made of a plastic material; a stopper bar 34 installed on the outer sidewall 2a, for being engaged with the engaging member 33a when the sliding door 3 is fully opened, and locking the stopper bar holder 33, when the sliding door is fully opened, to prevent the sliding door 3 from rocking in the X and Y-axis directions; and a lock striker 40, installed adjacent to the stopper bar 34, for being locked by a locking plate (not illustrated) installed on the sliding door 3 when the sliding door 3 is fully opened.

The rear stopper bar holder 33 is installed on the central portions of the sliding door 3 in a vertical direction, and the stopper bar 34 is installed in a portion of the outer sidewall 2a that gets away from the doorway 2b, when the sliding door 3 is fully opened, to lock the sliding door 3 at its opened position.

In FIGS. 4, 6, 8, 9, and 11, an operator cab for heavy equipment according to another embodiment of the present invention is illustrated. When a sliding door 3 is fully opened or closed, it is prevented from rocking by upper stoppers 21 and 121 and lower stoppers 23 and 123.

The operator cab 2 according to an embodiment of the present invention includes an outer sidewall 2a having a doorway 2b formed thereon and an outer surface that is in an arc shape; upper and lower rails 4 and 5 provided on upper and lower portions of the outer sidewall 2a, respectively; a sliding door 3 being slid by upper and lower rollers 7 and 8 that are engaged with the upper and lower rails 4 and 5, respectively, to open or close the doorway 2b; an upper stopper 21 of an opened position, installed in the opened position of the outer sidewall 2a in which the sliding door 3 is fully opened, for being in contact with the upper roller 7 when the sliding door 3 is fully opened, and preventing the sliding door 3 from rocking in X and Y-axis directions by pressure of a pad 20 elastically supported to produce a displacement in an X-axis direction when the upper stopper 21 becomes in contact with the upper roller 7; a lower stopper 23 of an opened position, installed in the opened position of the outer sidewall 2a in which the sliding door 3 is fully opened, for being in contact with the lower roller 8 when the sliding door 3 is fully opened, and preventing the sliding door from rocking in X, Y, and Z-axis directions by pressure of a pad 20 elastically supported to produce a displacement in the X-axis direction when the lower stopper 23 becomes in contact with the lower roller 8; an upper stopper 121 of a closed position, installed in the closed position of the outer sidewall 2a in which the sliding door 3 is fully closed, for being in contact with the upper roller 8 when the sliding door 3 is fully closed, and preventing the sliding door 3 from rocking in the X and Y-axis directions by pressure of a pad 20 elastically supported to produce a displacement in the X-axis direction when the upper stopper 121 of the closed position becomes in contact with the upper roller 7; and a lower stopper 123 of a closed position, installed in the closed position of the outer sidewall 2a in which the sliding door 3 is fully closed, for being in contact with the lower roller 8 when the sliding door 3 is fully closed, and preventing the sliding door 3 from rocking in the X, Y, and Z-axis directions by pressure of a pad 20 elastically supported to produce a displacement in the X-axis direction when the lower stopper 123 of the closed position becomes in contact with the lower roller 8.

When the sliding door 3 is fully opened, the pad 20 of the upper stopper 21 of the opened position presses the upper roller 7 to prevent the sliding door 3 from rocking in the X and Y-axis directions, and the pad 20 of the lower stopper 23 of the opened position presses the lower roller 8 to prevent the sliding door 3 from rocking in the X and Z-axis directions.

When the sliding door 3 is fully closed, the pad 20 of the upper stopper 121 of the closed position presses the upper roller 7 to prevent the sliding door 3 from rocking in the X and Y-axis directions, and the pad 20 of the lower stopper 123 of the closed position presses the lower roller 8 to prevent the sliding door 3 from rocking in the X and Z-axis directions.

In this case, since a stopper bar holder 33 formed on the inner rear surface of the sliding door 3, a stopper bar 34 installed on the outer sidewall 2a, for being engaged with the stopper bar holder 33, and a lock striker 40, installed adjacent to the stopper bar 34, for being locked by a locking plate (not illustrated) installed on the sliding door 3 are applied in the same manner as those in one embodiment of the present invention, the detailed description thereof will be omitted, and the same drawing reference numerals will be used for the same elements across various figures.

In FIGS. 4, 6, 7, 8, 9, and 12, an operator cab for heavy equipment according to still another embodiment of the present invention is illustrated. When a sliding door 3 is fully opened, it is prevented from rocking by an upper stopper 21, a central stopper 22, and a lower stopper 23.

The operator cab 2 according to still another embodiment of the present invention includes an outer sidewall 2a having a doorway 2b formed thereon and an outer surface that is in an arc shape; upper, central, and lower rails 4, 6, and 5 provided on upper, central, and lower portions of the outer sidewall 2a, respectively; a sliding door 3 being slid by upper, central, and lower rollers 7, 9, and 8 that are engaged with the upper, central, and lower rails 4, 6, and 5, respectively, to open or close the doorway 2b; an upper stopper 21 of an opened position, installed in the opened position of the outer sidewall 2a in which the sliding door 3 is fully opened, for being in contact with the upper roller 7 when the sliding door is fully opened, and preventing the sliding door 3 from rocking in X and Y-axis directions by pressure of a pad 20 elastically supported to produce a displacement in an X-axis direction when the upper stopper 21 becomes in contact with the upper roller 7; a central stopper 22 of an opened position, installed in the opened position of the outer sidewall 2a in which the sliding door 3 is fully opened, for being in contact with the central roller 9 when the sliding door 3 is fully opened, and preventing the sliding door 3 from rocking in X, Y, and Z-axis directions by pressure of a pad 20 elastically supported to produce a displacement in the X-axis direction when the central stopper 22 becomes in contact with the central roller 9; and a lower stopper 23 of an opened position, installed in the opened position of the outer sidewall 2a in which the sliding door 3 is fully opened, for being in contact with the lower roller 8 when the sliding door 3 is fully opened, and preventing the sliding door 3 from rocking in the X, Y, and Z-axis directions by pressure of a pad elastically supported to produce a displacement in the X-axis direction when the lower stopper 23 becomes in contact with the lower roller 8.

In this case, since a stopper bar holder 33 formed on the inner rear surface of the sliding door 3, a stopper bar 34 installed on the outer sidewall 2a, for being engaged with the stopper bar holder 33, and a lock striker 40, installed adjacent to the stopper bar 34, for being locked by a locking plate (not illustrated) installed on the sliding door 3 are applied in the same manner as those in one embodiment of the present invention, the detailed description thereof will be omitted, and the same drawing reference numerals will be used for the same elements across various figures.

Figure 4A:
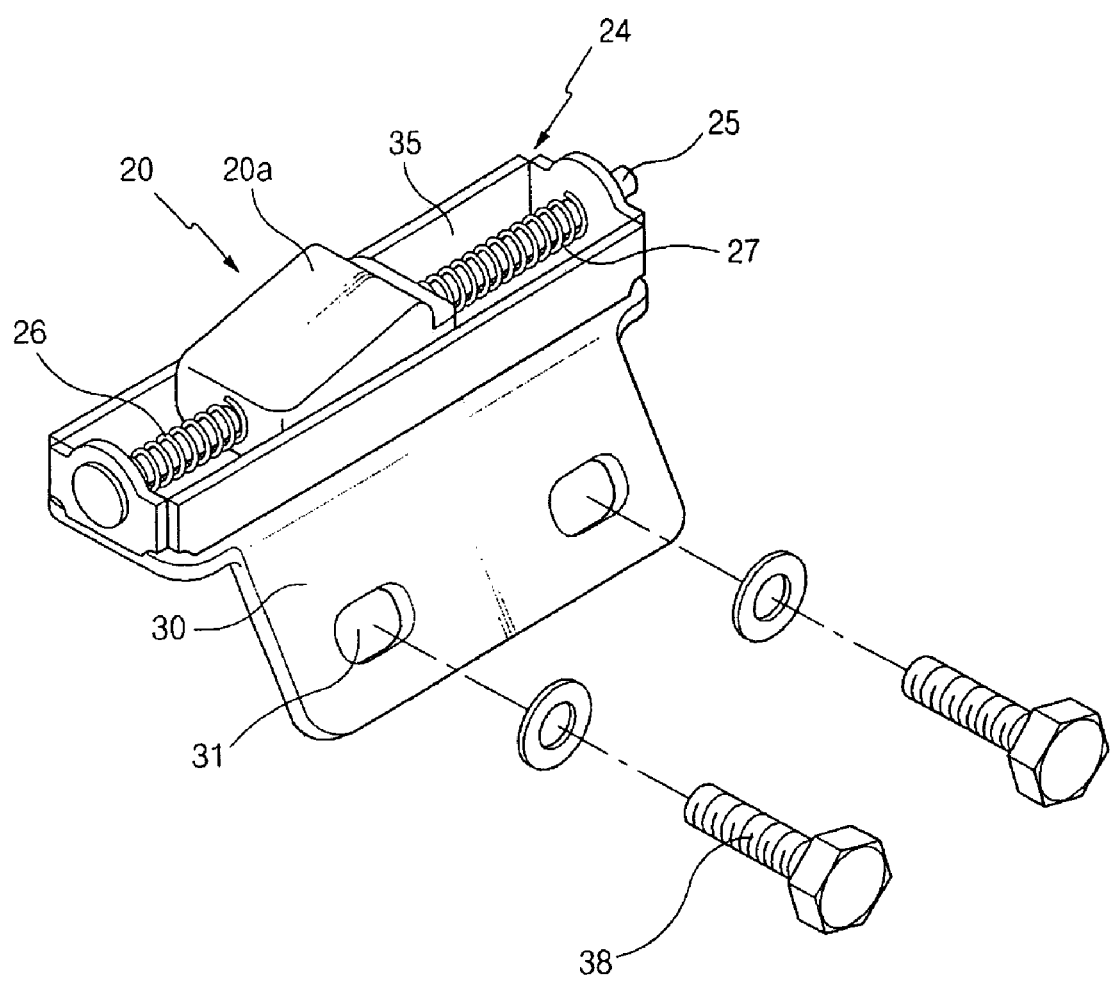
FIG. 4a is a perspective view of a stopper mounted on an operator cab for heavy equipment according to an embodiment of the present invention.

At least one of the upper, central, and lower stoppers 21, 22, and 23, as shown in FIG. 4a, includes a case 24 mounted on the outer sidewall 2a; a pad 20 being movably engaged with a bar-shaped guide 25 fixed to penetrate the case 24, and having a slant surface 20a upwardly formed in a direction in which the sliding door 3 is opened or closed; and elastic members 26 and 27 installed on outer surfaces of the guide 25 in forward and backward directions of the pad 20 to fix the sliding door 3 by pressing the pad 20 being in contact with any one of the upper, central, and lower rollers 7, 9, and 8 by their elastic restoring forces when the sliding door is fully opened.

Figure 4B:
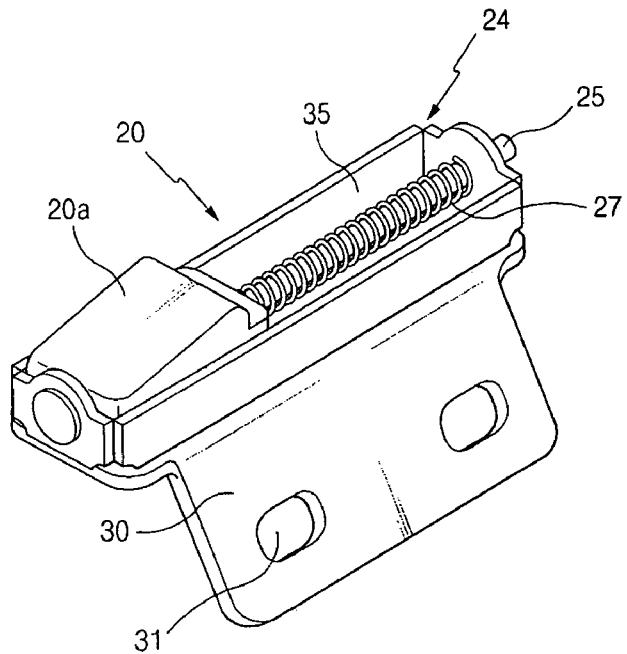
FIG. 4b is an exemplary view illustrating a modified stopper mounted on an operator cab for heavy equipment according to an embodiment of the present invention.

As shown in FIG. 4b, after the sliding door 3 is locked in the opened position in which the sliding door 3 is fully opened, the pad 20 produces no displacement any more in the X-axis direction. Due to this, the elastic member 27 may be installed only in the guide in the direction in which the pad 20 is pressed (i.e., the elastic member 27 may be installed only in the backward direction of the pad 20).

Figure 4C:
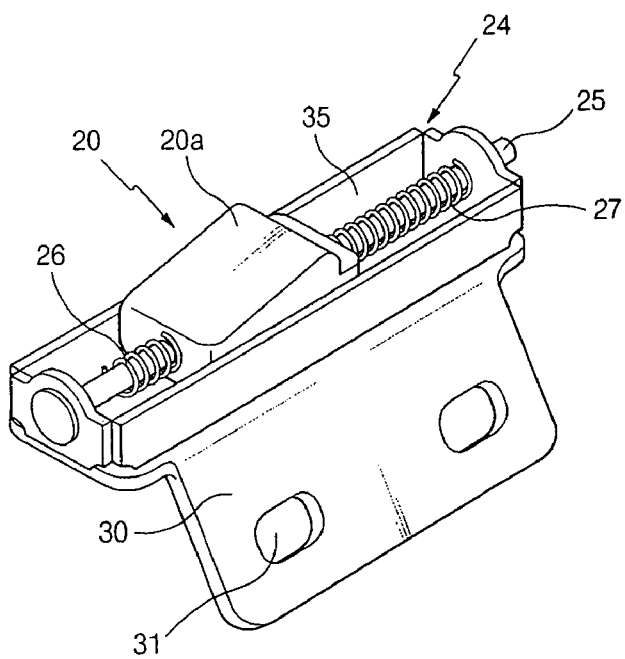
FIG. 4c is an exemplary view illustrating another modified stopper mounted on an operator cab for heavy equipment according to an embodiment of the present invention.

As shown in FIG. 4c, the elastic members 26 and 27 may be installed on the guide 25 in the forward and backward directions of the pad 20 in such a manner that the elastic member 26 installed in the forward direction of the pad 20 has a strength relatively higher than the elastic member 27 installed in the backward direction of the pad 20, and may be installed on a part of the guide 25 in the forward direction of the pad 20. That is, the elastic member 27 has a low strength, and thus the sliding door 3 can be opened by a small force.

The case 24 includes a pair of partition members 35, formed to correspond to the forward and backward directions of the case 24 around the pad 20, for guiding the rectilinear movement of the pad 20 in the X-axis direction if any one of the upper, central, and lower rollers 7, 9, and 8 becomes in contact with the pad 20 due to the movement of the sliding door 3.

The upper, central, and lower stoppers 21, 22, and 23 are installed on the outer sidewall 2a in a state that the number of the upper, central, and lower stoppers 21, 22, and 23 corresponds to the number of the upper, central, and lower rollers 7, 9, and 8.

The upper stopper 21, as shown in FIGS. 5, 6, 11, and 12, is installed to press a guide roller 7a of the upper roller 7 in X and Y-axis directions through the contact with the pad 20, when the sliding door 3 is fully opened or closed, to prevent the sliding door 3 from rocking in the X and Y-axis directions.

The lower stopper 23, as shown in FIGS. 5, 8, 11, and 12, includes a first lower stopper 23a installed to press a first lower roller (i.e., a rolling roller 8a of the lower roller 8) in the X and Z-axis directions through the contact with the pad 20, when the sliding door 3 is fully opened or closed, to prevent the sliding door 3 from rocking in the X and Z-axis directions; and a second lower stopper 23b installed to press a second lower roller (i.e., a guide roller 8b of the lower roller 8) in the X and Y-axis directions through the contact with the pad 20, when the sliding door is fully opened or closed, to prevent the sliding door 3 from rocking in the X and Y-axis directions.

Figure 7:
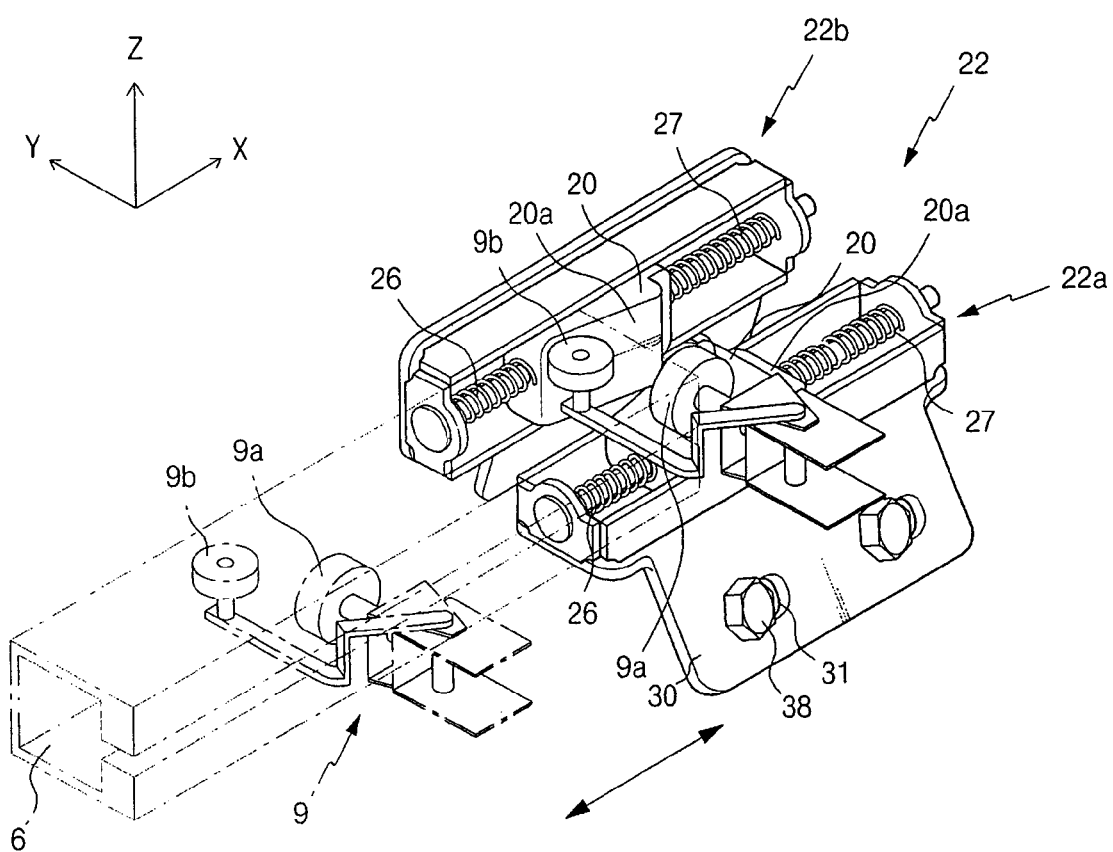
FIG. 7 is a view explaining the use of a central stopper shown in FIG. 12.
Figure 12:
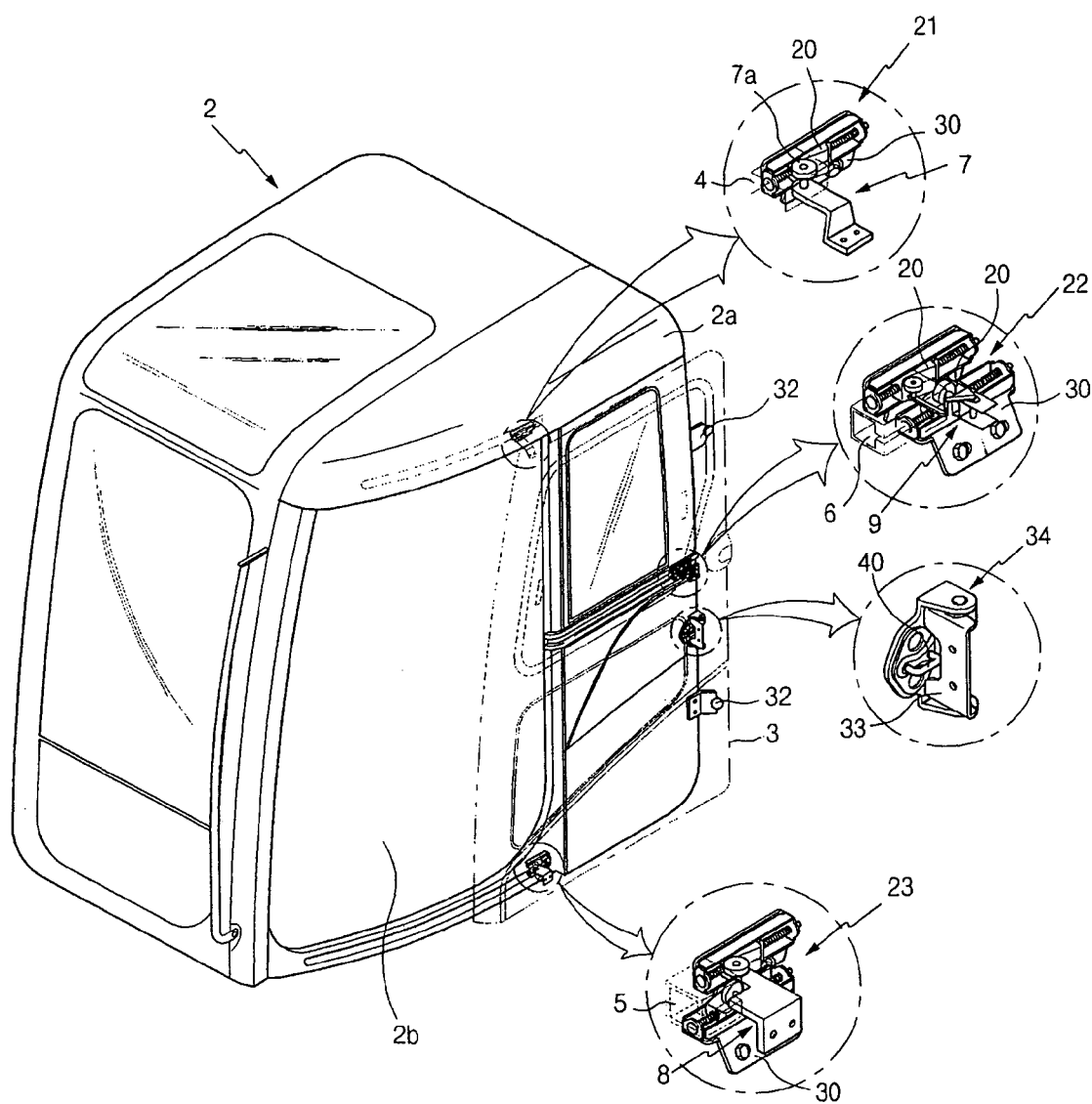
FIG. 12 is a perspective view of an operator cab for heavy equipment according to still another embodiment of the present invention.

The central stopper 22, as shown in FIGS. 7 and 12, includes a first central stopper 22a installed to press a first central roller (i.e., a rolling roller 9a of the central roller 9) in the X and Z-axis directions through the contact with the pad 20, when the sliding door 3 is fully opened, to prevent the sliding door 3 from rocking in the X and Z-axis directions; and a second central stopper 22b installed to press a second central roller (i.e., a guide roller 9b of the central roller 9) in the X and Y-axis directions through the contact with the pad 20, when the sliding door 3 is fully opened, to prevent the sliding door 3 from rocking in the X and Y-axis directions.

The upper, central, and lower stoppers 21, 22, and 23 are respectively installed at inner end portions of the upper, central, and lower rails 4, 6, and 5 of the opened position in which the sliding door 3 is fully opened.

The upper and lower stoppers 21 and 23 of the closed position are respectively installed at inner end portions of the upper and lower rails 4 and 5 of the closed position in which the sliding door is fully closed, and the upper and lower stoppers 21 and 23 of the opened position are respectively installed at inner end portions of the upper and lower rails 4 and 5 of the opened position in which the sliding door is fully opened.

As shown in FIGS. 4a to 4c, 10a and 10b, the case 24 is provided with a bracket 30 for fixing the case to the outer sidewall 2a, which has circular or elongated fastening holes 31 formed thereon, so that any one of the upper, central, and lower stoppers 21, 22, and 23 is moved in the X or Z-axis direction against the outer sidewall 2a to fix the stoppers to the outer sidewall when the manufacturing deviation occurs between the operator cab 2 and the sliding door 3 or the pads 20 are worn away due to their prolonged use.

Figure 5:
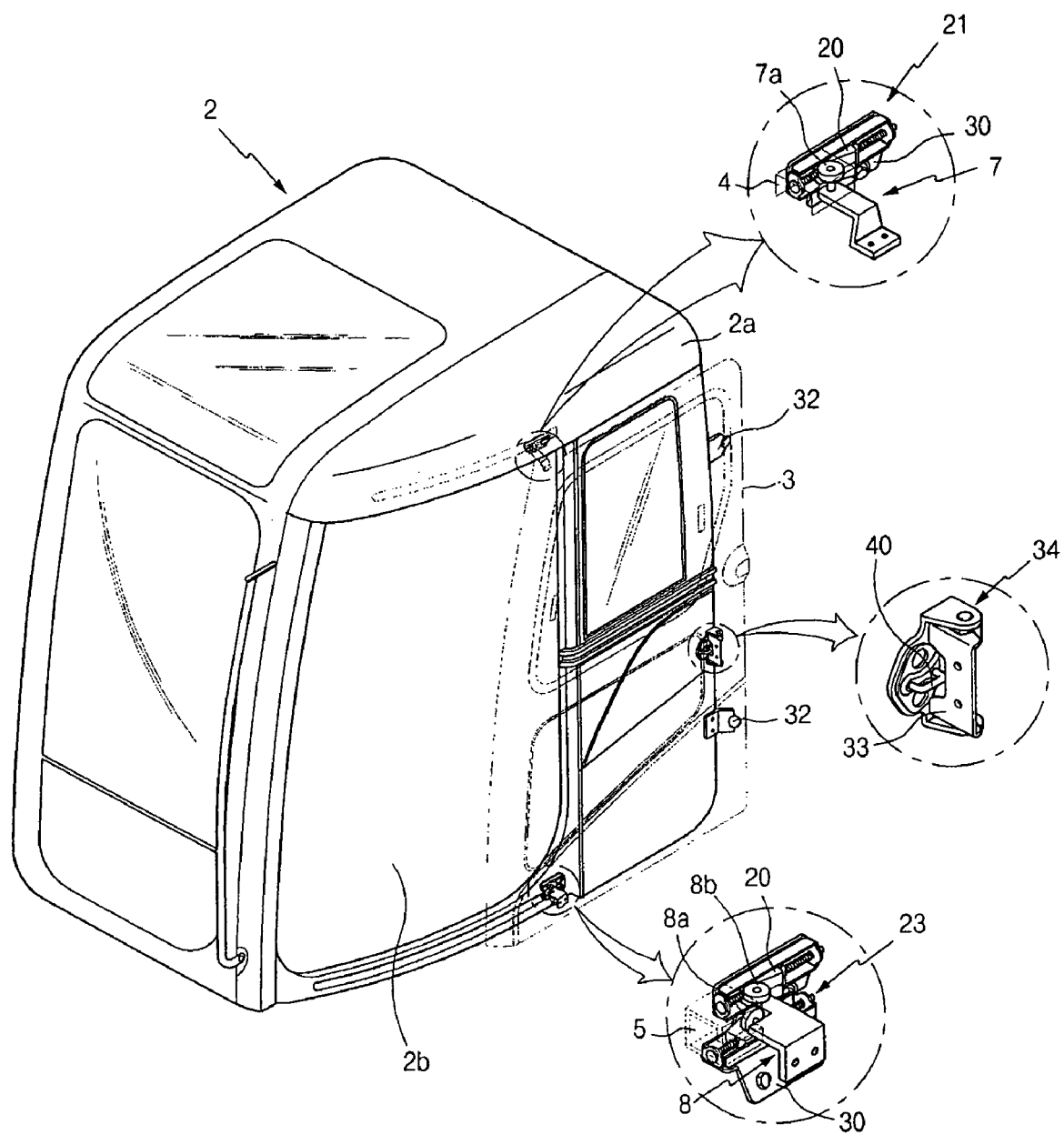
FIG. 5 is a perspective view of an operator cab having stoppers mounted thereon according to an embodiment of the present invention.
Figure 6:
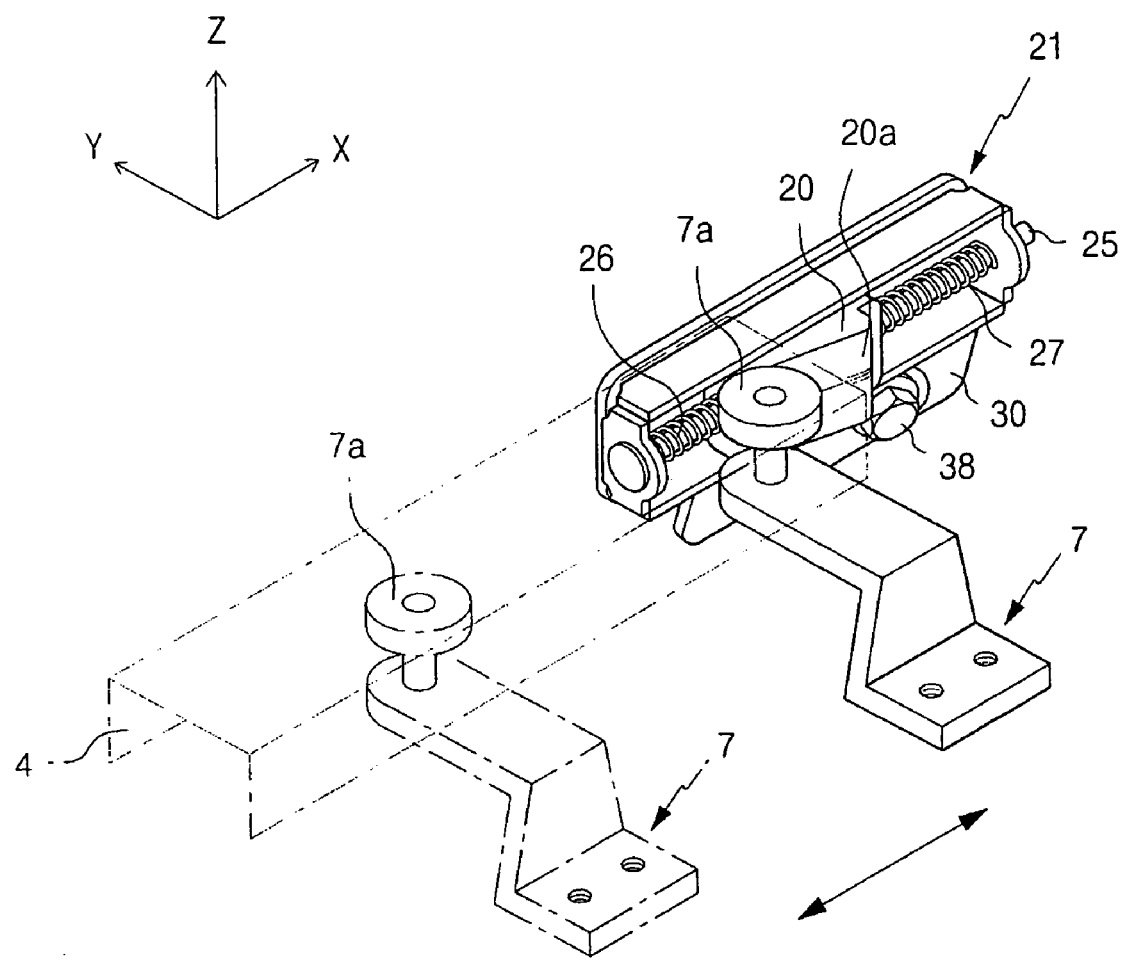
FIG. 6 is a view explaining the use of an upper stopper shown in FIG. 5.

As shown in FIGS. 5 and 6, the upper roller 7 includes a guide roller 7a that is rotated in the Y-axis direction along the upper rail 4 when the sliding door 3 is opened or closed.

As shown in FIG. 7, the central roller 9 includes a first central roller (i.e., a rolling roller 9a of the central roller 9) that is rotated in the X-axis direction along the center rail 6, when the sliding door 3 is opened or closed, to support the load of the sliding door 3, and a second central roller (i.e., a guide roller 9b of the central roller 9) that is rotated in the Y-axis direction, when the sliding door 3 is opened or closed, to prevent the sliding door 3 from seceding from the central rail 6.

Figure 8:
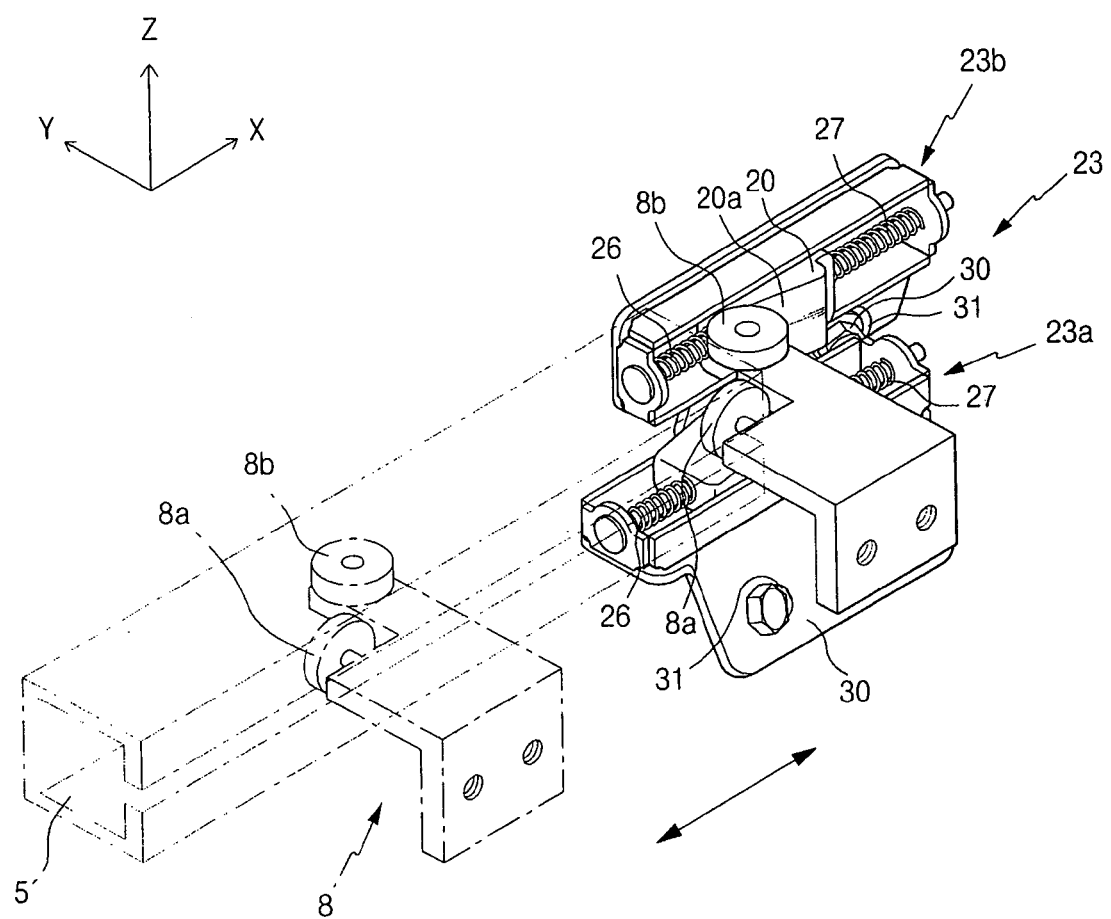
FIG. 8 is a view explaining the use of a lower stopper shown in FIG. 5.

As shown in FIG. 8, the lower roller 8 includes a first lower roller (i.e., a rolling roller 8a of the lower roller 8) that is rotated in the X-axis direction along the lower rail 5, when the sliding door 3 is opened or closed, to support the load of the sliding door 3, and a second lower roller (i.e., a guide roller 8*b* of the lower roller 8) that is rotated in the Y-axis direction, when the sliding door 3 is opened or closed, to prevent the sliding door 3 from seceding from the lower rail 5.

Hereinafter, the operation of the operator cab for heavy equipment according to an embodiment of the present invention will be described with reference to the accompanying drawings.

As shown in FIGS. 4 to 6, 8, and 9, in the case where the sliding door 3 is slid in the backward direction of the cab 2 (i.e., to a position that gets away from the doorway 2*b*) by an operator to open the sliding door 3, the upper and lower rollers 7 and 8 provided on the upper and lower portions of the sliding door 108 are slid along the upper and lower rails 4 and 5 provided on the outer sidewall 2*a*, and thus the sliding door 3 is opened (as shown with the dotted line in FIG. 5).

At this time, since the opened sliding door 3 is positioned within the swing radius of the operator cab 2, the sliding door 3 does not interfere with buildings or trees adjacent to the working site even when the upper swivel structure swings on a narrow alley of a downtown area in a state that the sliding door 3 is opened.

At this time, as shown in FIG. 6, the rocking or rattling of the sliding door 3 in the X or Y-axis direction can be suppressed by pressing the upper roller 7 through the contact with the pad 20 of the upper stopper 21.

When the sliding door 3 is moved to the opened position in which the sliding door 3 is fully opened, the guide roller 7*a* of the upper roller 7 becomes in contact with the slant surface 20*a* of the pad 20 of the upper stopper 21, and thus cannot move any further in the X-axis direction (i.e., the forward/backward direction of the cab 2, or the direction in which the sliding door 3 is opened).

Due to the contact with the guide roller 7*a*, the pad 20 is moved forward or backward along the guide 25 to produce a displacement in the X-axis direction. In this case, a compressive force acts on the elastic member 27 installed in the rear of the pad 20, and a tensile force acts on the elastic member 26 installed in the front of the pad 20, as shown in the drawing.

The pad 20 is fixed by the elastic restoring forces of the elastic members 26 and 27 elastically installed in the guide 25 of the upper stopper 21. Since the guide roller 7*a* is pressed in the X-axis direction (i.e., the forward/backward direction of the cab 2) by the structure of the slant surface 20*a* of the fixed pad 20 as shown in the drawing, the sliding door 3 is prevented from rocking or rattling in the X-axis direction.

Simultaneously, since the guide roller 7*a* of the upper roller 7 is pressed in the Y-axis direction (i.e., the right/left direction of the cab 2) through the contact with the fixed pad 20 as shown in the drawing, the sliding door 3 is prevented from rocking or rattling in the Y-axis direction.

Accordingly, in the case of moving the sliding door 3 to the opened position in which the sliding door is fully opened, the upper roller 7 is pressed in the X and Y-axis directions through the contact with the pad 20 of the upper stopper 21, and thus the sliding door 3 is prevented from rocking or rattling in the X and Y-axis directions.

As shown in FIGS. 5 and 8, by pressing the lower roller 8 through the contact with the pad 20 of the lower stopper 23, the sliding door 3 can be prevented from rocking or rattling in the X, Y, or Z-axis direction.

When the sliding door 3 is moved to the opened position in which the sliding door 3 is fully opened, the first lower roller of the lower roller 8 (i.e., the rolling roller 8*a* of the lower roller 8) becomes in contact with the slant surface 20*a* of the pad 20 of the first lower stopper 23*a*, and thus cannot move any further in the X-axis direction (i.e., the forward/backward direction of the cab 2, or the direction in which the sliding door 3 is opened).

Due to the contact with the rolling roller 8*a*, the pad 20 is moved in the X-axis direction along the guide 25 to produce a displacement in the X-axis direction. In this case, the position of the pad 20 is determined by the elastic restoring forces of the pair of elastic members 26 and 27 installed on right and left portions of the pad 20.

Since the rolling roller 8*a* is pressed in the X-axis direction (i.e., the forward/backward direction of the cab 2) by the structure of the slant surface 20*a* of the fixed pad 20 as shown in the drawing, the sliding door 3 is prevented from rocking or rattling in the X-axis direction.

Simultaneously, since the rolling roller 8*a* is pressed in the Z-axis direction (i.e., the upward/downward direction of the cab 2) through the contact with the fixed pad 20, the sliding door 3 is prevented from rocking or rattling in the Z-axis direction.

On the other hand, the second lower roller of the lower roller 8 (i.e., the guide roller 8*b* of the lower roller 8) becomes in contact with the slant surface 20*a* of the pad 20 of the second lower stopper 23*b*, and thus cannot move any further in the X-axis direction (i.e., the forward/backward direction of the cab 2).

Due to the contact with the guide roller 8*b*, the pad 20 is moved in the X-axis direction along the guide 25 to produce a displacement in the X-axis direction. In this case, the position of the pad 20 is determined by the elastic restoring forces of the pair of elastic members 26 and 27 installed on right and left portions of the pad 20.

Since the guide roller 8*b* is pressed in the X-axis direction (i.e., the forward/backward direction of the cab 2) by the structure of the slant surface 20*a* of the fixed pad 20 as shown in the drawing, the sliding door 3 is prevented from rocking or rattling in the X-axis direction.

Simultaneously, since the guide roller 8*b* of the lower roller 8 is pressed in the Y-axis direction (i.e., the right/left direction of the cab 2) through the contact with the fixed pad 20, the sliding door 3 is prevented from rocking or rattling in the Y-axis direction.

Accordingly, in the case of fully opening the sliding door 3, the first lower roller (i.e., the rolling roller 8*a*) is pressed in the X and Z-axis directions through the contact with the pad 20 of the first lower stopper 23*a*, and thus the sliding door 3 is prevented from rocking or rattling in the X and Z-axis directions. Simultaneously, the second lower roller (i.e., the guide roller 8*b*) is pressed in the X and Y-axis directions through the contact with the pad 20 of the second lower stopper 23*b*, and thus the sliding door 3 is prevented from rocking or rattling in the X and Y-axis directions.

Figure 9:
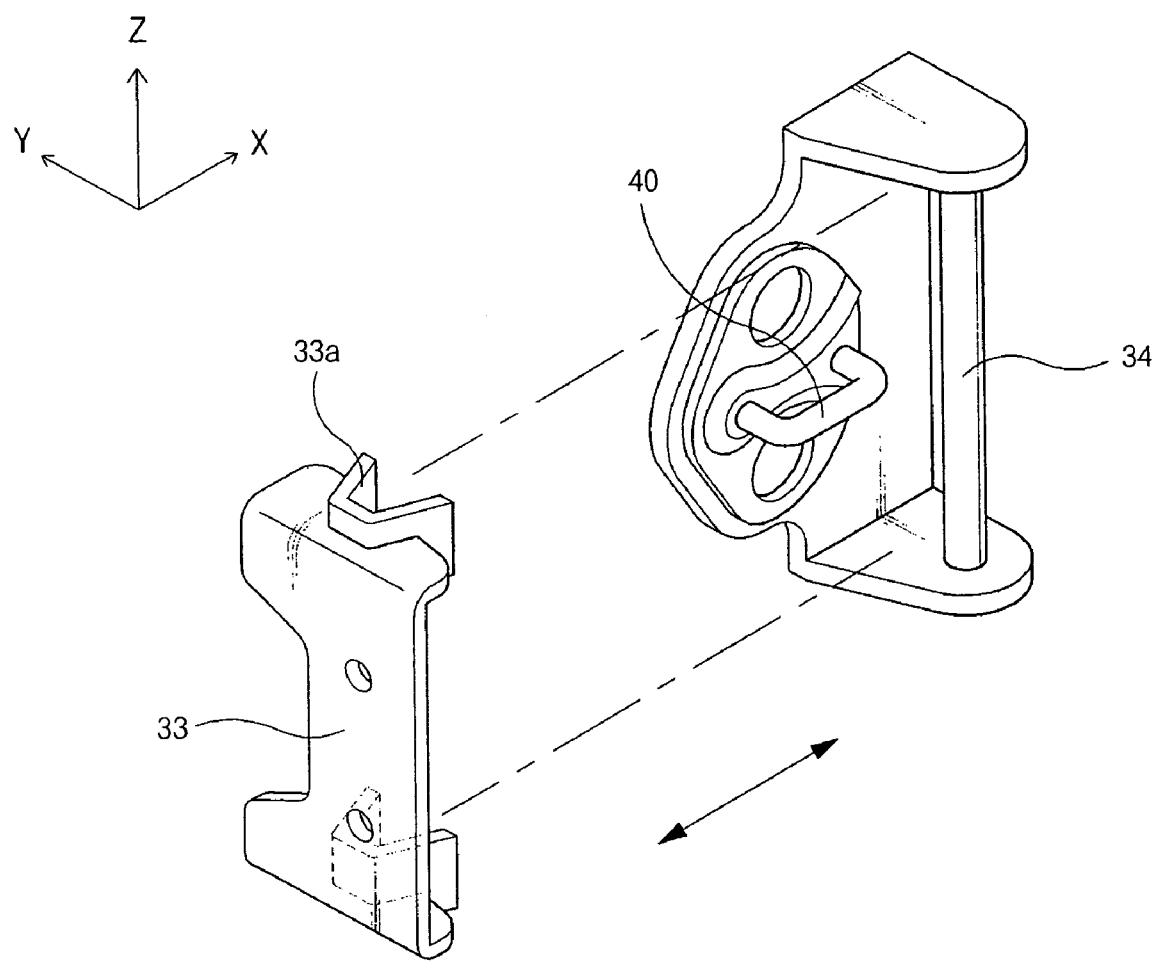
FIG. 9 is an illustrative perspective view of main parts of a stopper bar holder and a stopper bar shown in FIG. 5.

As shown in FIG. 9, when the sliding door 3 is moved to the opened position where the sliding door 3 is fully opened, the engaging member 33*a* of the rear stopper bar holder 33, which is made of a plastic material and is installed on the inner surface of the sliding door 3 in the position that gets away from the doorway 2*b*, is engaged with the stopper bar 34 installed on the outer sidewall 2*a*.

Accordingly, the stopper bar 34 is locked into the stopper bar holder 33 in the opened position where the sliding door 3 is fully opened, and thus the sliding door 3 is prevented from rocking or rattling in the X and Y-axis directions as shown in the drawing.

When the stopper bar 34 is engaged with the stopper bar holder 33, the sliding door 3 can be locked in the position where the sliding door 3 is fully opened by locking the lock striker 40 installed adjacent to the stopper bar 34 into a locking plate (not illustrated) installed adjacent to the stopper bar holder 34.

In addition, when the sliding door 3 is moved to the opened position where the sliding door 3 is fully opened, the outer surface of the sliding door 3 becomes in close contact with the supporters 32 installed on the upper and lower portions of the outer sidewall 2a. Accordingly, the sliding door 3 is prevented from rocking or rattling in the X-axis direction.

As shown in FIGS. 4, 6, 7, 8, and 12 (according to another embodiment of the present invention), in the case where the sliding door 3 is moved to the fully-opened position along the upper, central, and lower rails 4, 6, and 5, the upper, central, and lower rollers 7, 9, and 8 of the sliding door 3 become in contact with the slant surfaces of the respective pads 20 of the upper, central, and lower stoppers 21, 22, and 23 installed on the upper, central, and lower portions of the outer sidewall 2a.

In this case, the upper and lower stoppers 21 and 22 are applied in the same manner as those in one embodiment of the present invention, the detailed description thereof will be omitted.

As shown in FIGS. 7 and 12, by pressing the central roller 9 through the contact with the pad 20 of the central stopper 22, the sliding door 3 can be prevented from rocking or rattling in the X, Y, and Z-axis directions.

When the sliding door 3 is moved to the opened position in which the sliding door 3 is fully opened, the first central roller of the central roller 9 (i.e., the rolling roller 9a of the central roller 9) becomes in contact with the slant surface 20a of the pad 20 of the first central stopper 22a, and thus cannot move any further in the X-axis direction (i.e., the forward/backward direction of the cab 2, or the direction in which the sliding door 3 is opened).

Due to the contact with the rolling roller 9a, the pad 20 is moved in the X-axis direction along the guide 25 to produce a displacement in the X-axis direction. In this case, the position of the pad 20 is determined by the elastic restoring forces of the pair of elastic members 26 and 27 installed on the right and left portions of the pad 20.

Since the rolling roller 9a is pressed in the X-axis direction (i.e., the forward/backward direction of the cab 2) by the structure of the slant surface 20a of the fixed pad 20 as shown in the drawing, the sliding door 3 is prevented from rocking or rattling in the X-axis direction.

Simultaneously, since the rolling roller 9a is pressed in the Z-axis direction (i.e., the upward/downward direction of the cab 2) through the contact with the fixed pad 20, the sliding door 3 is prevented from rocking or rattling in the Z-axis direction.

On the other hand, the second central roller of the central roller 9 (i.e., the guide roller 9b of the central roller 9) becomes in contact with the slant surface 20a of the pad 20 of the second central stopper 22b, and thus cannot move any further in the X-axis direction (i.e., the forward/backward direction of the cab 2, or the direction in which the sliding door 3 is opened).

Due to the contact with the guide roller 9b, the pad 20 is moved in the X-axis direction along the guide 25 to produce a displacement in the X-axis direction. In this case, the position of the pad 20 is determined by the elastic restoring forces of the pair of elastic members 26 and 27 installed on the right and left portions of the pad 20.

Since the guide roller 9b is pressed in the X-axis direction (i.e., the forward/backward direction of the cab 2) by the structure of the slant surface 20a of the fixed pad 20 as shown in the drawing, the sliding door 3 is prevented from rocking or rattling in the X-axis direction.

Simultaneously, since the guide roller 9b is pressed in the Y-axis direction (i.e., the right/left direction of the cab 2) through the contact with the fixed pad 20, the sliding door 3 is prevented from rocking or rattling in the Y-axis direction.

Accordingly, in the case of fully opening the sliding door 3, the first central roller (i.e., the rolling roller 9a) is pressed in the X and Z-axis directions through the contact with the pad 20 of the first central stopper 22a, and thus the sliding door 3 is prevented from rocking or rattling in the X and Z-axis directions. Simultaneously, the second central roller (i.e., the guide roller 9b) is pressed in the X and Y-axis directions through the contact with the pad 20 of the second central stopper 22b, and thus the sliding door 3 is prevented from rocking or rattling in the X and Y-axis directions.

Figure 10A:
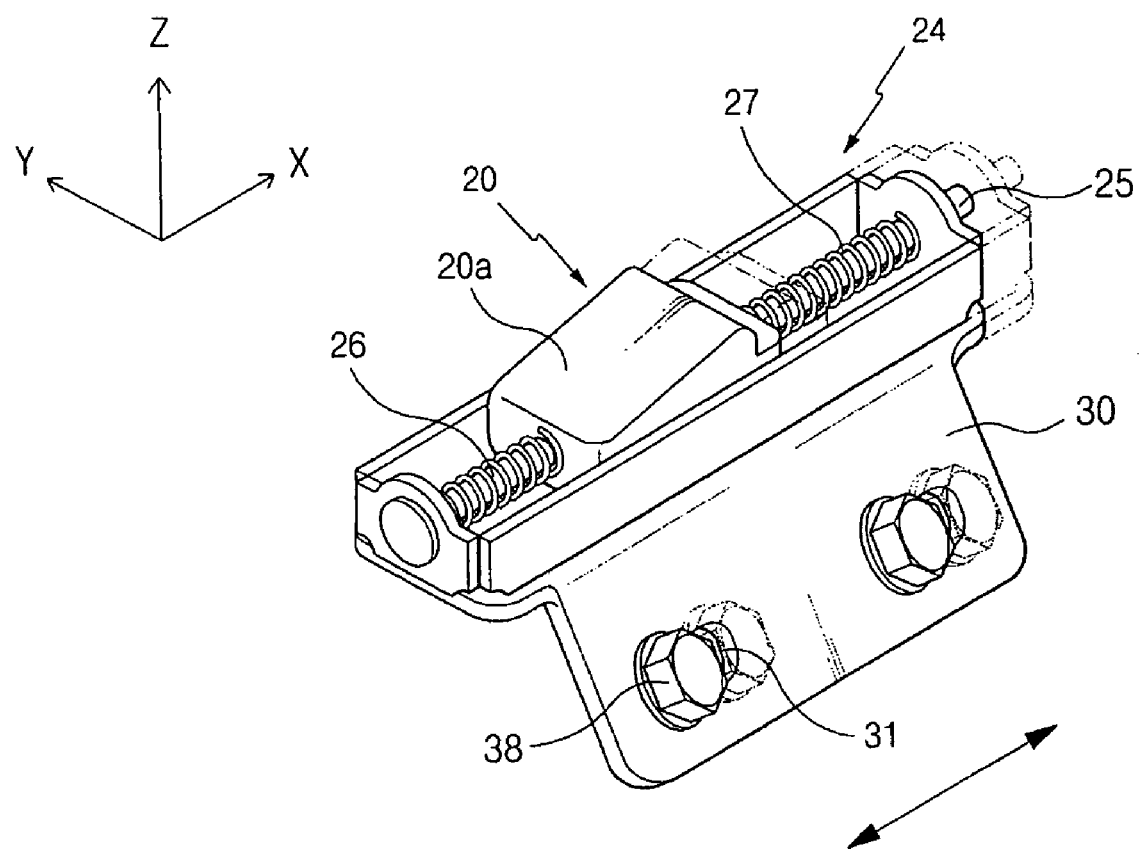
FIG. 10a is a view explaining the fixing of the stopper shown in FIG. 4 through movement of the fixing position thereof in an X-axis direction.
Figure 10B:
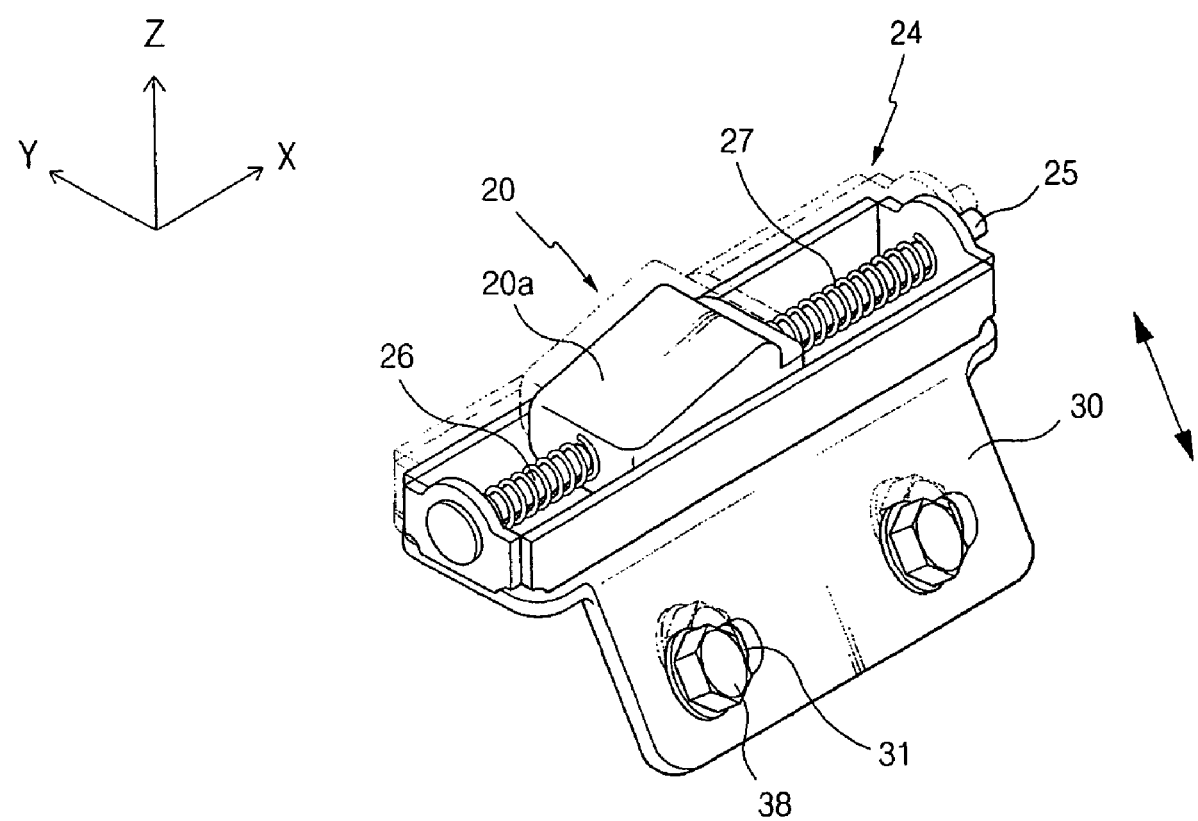
FIG. 10b is a view explaining the fixing of the stopper shown in FIG. 4 through movement of the fixing position thereof in a Y-axis direction.
Figure 11:
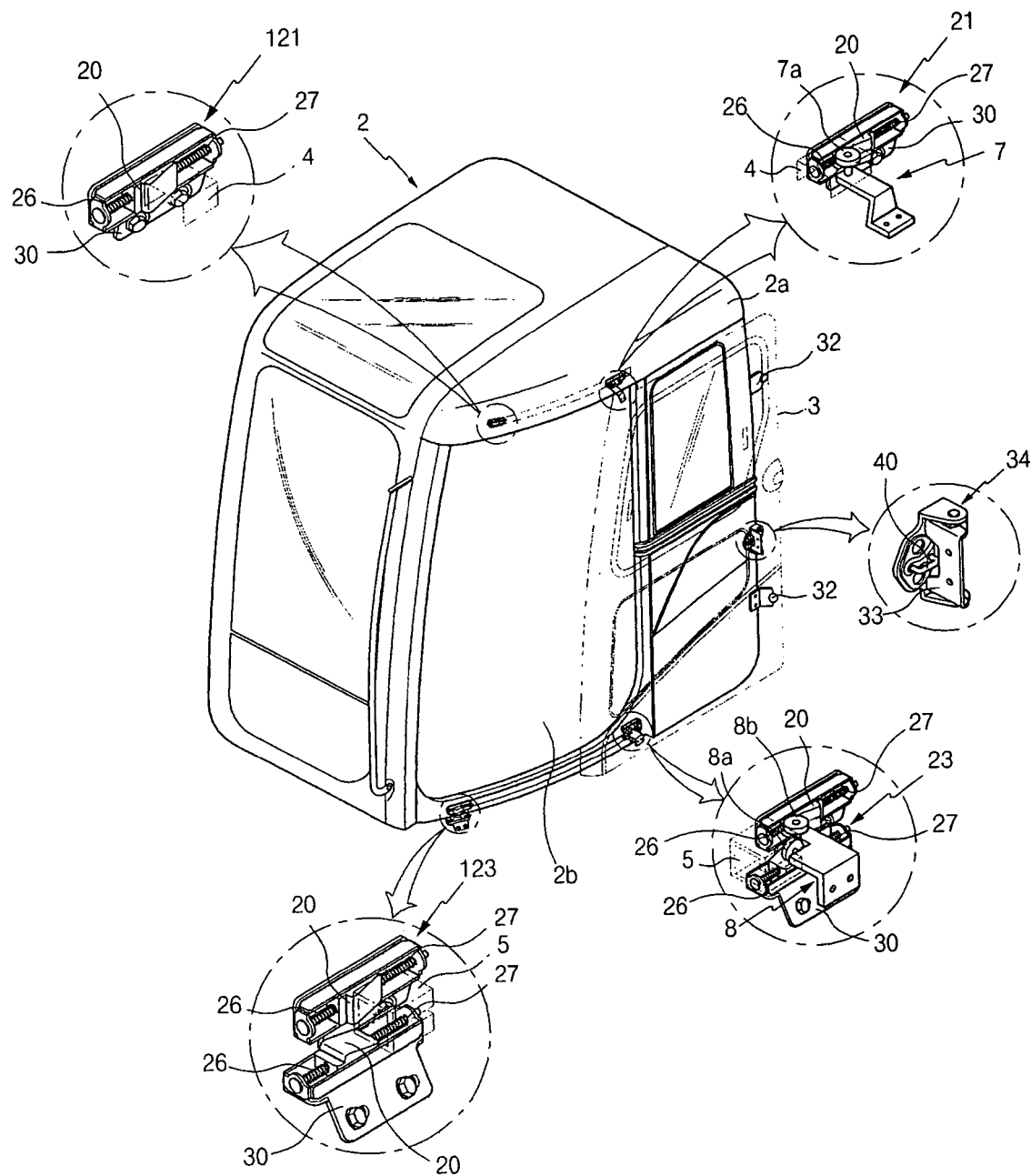
FIG. 11 is a perspective view of an operator cab for heavy equipment according to another embodiment of the present invention.

As shown in FIGS. 10a and 10b, the manufacturing deviation may occur between the outer sidewall 2a and the sliding door 3, or the pad 20, which is made of a plastic material, may be worn away due to the repeated opening/closing of the sliding door 3. In this case, the fixing position of the pads 20 with respect to the upper, central, and lower rollers 7, 9, and 8 can be adjusted in the X or Z-axis direction by minutely adjusting and fixing the position of the fastening members 38 mounted on the outer sidewall 2a, so that any one of the upper, central, and lower stoppers 21, 22, and 23 can be moved and fixed in the X or Z-axis direction against the outer sidewall 2a.

That is, as the bracket 30 has elongated (i.e., slot-shaped) fastening holes 31 that are engaged with the fastening members 38 for fixing the case 24 combined with the pad 20 to the outer sidewall 2a, the position of the case 24 can be adjusted by minutely moving the fastening member 38 in the X-axis direction (as indicated as a dotted line in FIG. 10a) or Z-axis direction (as indicated as a dotted line in FIG. 10b) within the fastening hole 31.

Accordingly, it is always possible to prevent the sliding door 3 from rocking occurring due to a shock or vibration being applied to the cab 2 in a state that the sliding door is fully opened or closed.

In the embodiments of the present invention, an operator cab mounted on the heavy equipment has been exemplified. However, it will be apparent that the present invention can also be applied to a passenger car or a commercial vehicle having sliding doors to prevent the doors from rocking or rattling in X, Y, and Z-axis directions when the car is driven in a state that the doors are closed.

As described above, the operator cab for heavy equipment according to the embodiments of the present invention has the following advantages.

A sliding door mounted on an operator cab is prevented from rocking or rattling in three directions (i.e., X, Y, and Z-axis directions) due to a shock or vibration being applied to the cab in a state that the sliding door is fully opened or closed, and thus an operator can concentrate upon his work.

The fixing position of stoppers can be minutely adjusted when the manufacturing deviation occurs between the cab and the sliding door, or the pad for the stopper is worn away, and thus it is always possible to suppress the rocking of the sliding door in a state that the sliding door is opened or closed.

The structure of stoppers is simplified to reduce the manufacturing cost, and protrusion of the stoppers outside the operator cab is minimized to improve the external appearance of the heavy equipment.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An operator cab for heavy equipment, comprising:
an outer sidewall having a doorway formed thereon;
upper and lower rails provided on upper and lower portions of the outer sidewall, respectively;
a sliding door including upper and lower rollers that are slidably engaged with the upper and lower rails, respectively, to open or close the doorway;
a first upper stopper secured on the outer sidewall to contact the upper roller when the sliding door is slid to a fully opened position, the first upper stopper including a pad having a slant surface thereon, the pad being elastically supported to produce a displacement in a forward/backward direction of the cab and a pressure on the upper roller when the upper roller comes into contact with the first upper stopper to prevent the sliding door from rocking at the fully opened position;
a first lower stopper secured on the outer sidewall to contact the lower roller when the sliding door is slid to the fully opened position, the first lower stopper including a pad having a slant surface thereon, the pad being elastically supported to produce a displacement in the forward/backward direction of the cab and a pressure on the lower roller when the lower roller comes into contact with the first lower stopper to prevent the sliding door from rocking at the fully opened position;
a second upper stopper secured on the outer sidewall to contact the upper roller when the sliding door is slid to a fully closed position, the second upper stopper including a pad having a slant surface thereon, the pad being elastically supported to produce a displacement in the forward/backward direction of the cab and a pressure on the upper roller when the upper roller comes into contact with the second upper stopper to prevent the sliding door from rocking at the fully closed position;
a second lower stopper secured on the outer sidewall to contact the lower roller when the sliding door is slid to the fully closed position, the second lower stopper including a pad having a slant surface thereon, the pad being elastically supported to produce a displacement in the forward/backward direction of the cab and a pressure on the lower roller when the lower roller comes into contact with the second lower stopper to prevent the sliding door from rocking at the fully closed position; and
a central stopper secured on the outer sidewall to contact a central roller when the sliding door is slid to the fully opened position, the central stopper including a pad having a slant surface thereon, the pad elastically supported to produce a displacement in a forward/backward direction of the cab and a pressure on the lower roller when the central roller comes into contact with the central stopper to prevent the sliding door from rocking at the fully opened position;
wherein
the sliding door further includes first and second lower rollers;
the first lower stopper comprises:
a first lower stopper unit arranged to pressure the first lower roller in the forward/backward direction and an upward/downward direction of the cab by a first pad, when the sliding door is fully opened position, to prevent the sliding door from rocking in the forward/backward direction and upward/downward directions of the cab; and a second lower stopper unit arranged to pressure the second lower roller in the forward/backward direction and a left/right direction of the cab by the pad, when the sliding door is fully opened position, to prevent the sliding door from rocking in the forward/backward and left/right directions of the cab;
the second lower stopper comprises:
a first lower stopper device arranged to pressure the first lower roller in the forward/backward direction and an upward/downward direction of the cab by a first pad, when the sliding door is fully closed position, to prevent the sliding door from rocking in the forward/backward direction and upward/downward directions of the cab; and a second lower stopper device arranged to pressure the second lower roller in the forward/backward direction and a left/right direction of the cab by the pad, when the sliding door is fully closed position, to prevent the sliding door from rocking in the forward/backward and left/right directions of the cab;
the sliding door further includes first and second central rollers; and
the central stopper comprises:
a first central stopper arranged to pressure the first central roller in the forward/backward direction and an upward/downward direction of the cab by a first pad, when the sliding door is fully opened position, to prevent the sliding door from rocking in the forward/backward direction and upward/downward directions of the cab; and a second central stopper arranged to pressure the second central roller in the forward/backward direction and a left/right direction of the cab by the pad, when the sliding door is fully opened position, to prevent the sliding door from rocking in the forward/backward and left/right directions of the cab.

2. The operator cab of claim 1, wherein at least one of the upper, central, and lower stoppers comprises:
a case mounted on the outer sidewall;
a pad being movably engaged with a guide fixed to penetrate the case, and having an upper surface upwardly inclined in a direction in which the sliding door is opened or closed; and
elastic members installed on outer surfaces of the guide in forward and backward directions of the pad to fix the sliding door by pressing the pad being in contact with any one of the upper, central, and lower rollers by their elastic restoring forces when the sliding door is fully opened.

3. The operator cab of claim 2, wherein the case comprises a pair of partition members, formed to correspond to the forward and backward directions of the case around the pad, for guiding a rectilineal movement of the pad in the forward/backward direction of the cab when the upper or lower roller comes into contact with the slant surface of the pad due to movement of the sliding door.

4. The operator cab of claim 2, wherein the elastic members are installed on the guide in forward and backward directions of the pad.

5. The operator cab of claim 2, wherein the elastic members are installed on the guide in a direction in which the pad is pressed.

6. The operator cab of claim 2, wherein the elastic members are installed on the guide in forward and backward directions of the pad in such a manner that the elastic member installed in the forward direction of the pad has a strength relatively higher than the elastic member installed in the backward direction of the pad, and is installed on a part of the guide in the forward direction of the pad.

7. The operator cab of claim 1, wherein the number of the upper and lower stoppers installed on the outer sidewall corresponds to the number of the upper and lower rollers.

8. The operator cab of claim 1, wherein the case is provided with a bracket for fixing the case to the outer sidewall, the bracket having elongated fastening holes formed thereon so as to provide adjustability of a location of any one of the upper, central, and lower stopper in the forward/backward direction and an upward/downward direction of the cab on the outer sidewall.

9. The operator cab of claim 1, further comprising a supporter, installed on an upper or lower portion of the outer sidewall, for being in surface contact with the sliding door, when the sliding door is at the fully opened position, to prevent the sliding door from rattling in the forward/backward direction of the cab.

10. The operator cab of claim 9, wherein the supporter is made of a plastic material.

11. The operator cab of claim 1, further comprising:
a stopper bar holder formed on an inner rear surface of the sliding door;
a stopper bar installed on the outer sidewall, for being engaged with the stopper bar holder when the sliding door is fully opened position, and locking the stopper bar holder, when the sliding door is at the fully opened position, to prevent the sliding door from rocking in the forward/backward direction and a right/left direction of the cab; and
a lock striker, installed adjacent to the stopper bar, for locking the sliding door when the sliding door is at the fully opened position.

12. The operator cab of claim 11, wherein the stopper bar holder is made of a plastic material.

13. The operator cab of claim 1, wherein the pad is made of a plastic material.

14. The operator cab of claim 1, wherein the first and second upper and lower stoppers are installed at inner end portions of the upper and lower rails.

15. The operator cab of claim 1, wherein the upper, central, and lower stoppers are installed at inner end portions of the upper, central, and lower rails.

* * * * *